D. G. LITTLEFIELD.
Coal Stove.
No. 1,594. Reissued Dec. 22, 1863.
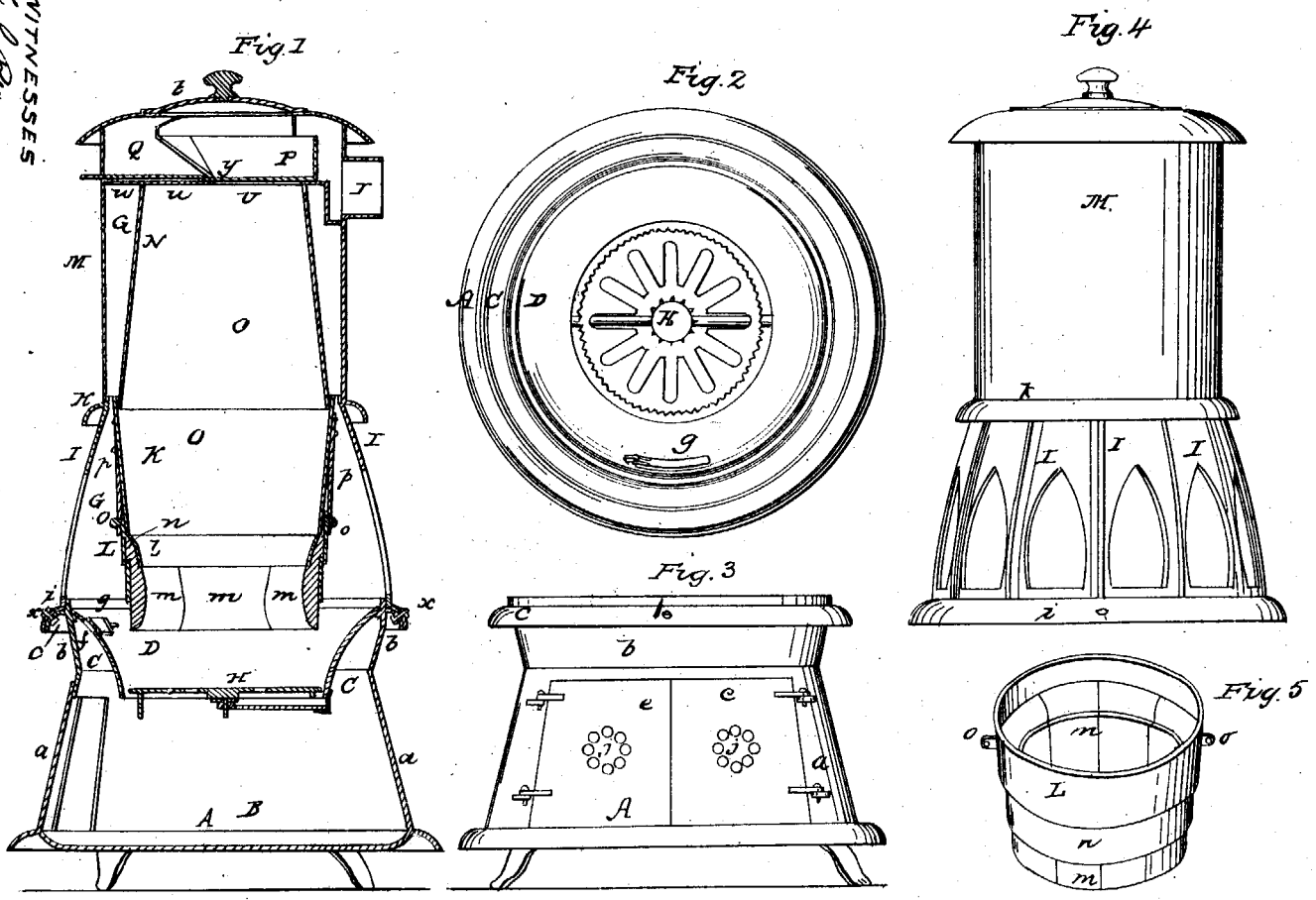
WITNESSES
J. L. Brown
R. F. Ongood
INVENTOR
Dennis G. Littlefield
N. PETERS, Photo-Lithographer, Washington, D. C.

UNITED STATES PATENT OFFICE.

DENNIS G. LITTLEFIELD, OF ALBANY, NEW YORK.

IMPROVEMENT IN COAL-STOVES.

Specification forming part of Letters Patent No. 39,582, dated August 18, 1863; Reissue No. 1,594, dated December 22, 1863.

*To all whom it may concern:*

Be it known that I, DENNIS G. LITTLEFIELD, of the city and county of Albany, and State of New York, have invented a new method of constructing that class of stoves employing a "supplying cylinder" or reservoir for reserve coal; and I do hereby declare that the following is a full and exact description of my invention, reference being had to the accompanying drawings, making part of this specification—

Figure 1 being a central vertical section in a plane from front to back; Fig. 2, a plan or top view of the lower section of the stove, including the fire-pot; Fig. 3, a front elevation of the lower section of the stove; Fig. 4, a front elevation of the upper section of the stove; Fig. 5, a view in perspective of the lower detachable part of the supplying cylinder or reservoir.

Like letters designate corresponding parts in all of the figures.

In that class of stoves which employ a supplying cylinder or reservoir for reserve fuel there are defects and imperfections which it is desirable to remedy, first, it is desirable to have the fire-pot so adapted to other parts of the stove that the greatest intensity of or most complete combustion may take place, and the maximum heat thereby produced be distributed as uniformly as possible to the heating-surfaces of the stove, and especially to this end that more heat may be radiated to the lower part of the apartment to be warmed, it is an object of desire to devise a method by which the intensely-heated surface of the fire-pot may communicate its heat to an enlarged surface surrounding it, and at the lower part of the stove, near the floor of said apartment, where there is usually a great deficiency of heat; second, it is desirable to improve the construction of the supplying-cylinder in its relation and adaptation to the fire-pot in order to prevent the destruction of the former and to promote the desired operation of the latter; third, it is desirable so to construct the stove not only as to be complete as an individual whole, but that it may be readily separated into convenient parts or sections for the purpose of repairs, or of replacing parts liable to be destroyed or injured by the action of the fire, and those sections be complete separately to the extent that they may be handled and transported by themselves without disturbing the arrangement and position of their component parts.

The first general object of my invention I effect by so forming and arranging the fire-pot as to be suspended in and to close at the top a chamber in the lower part or base of the stove, which chamber surrounds the sides and bottom of said fire-pot, whereby the heat radiated from the intensely-heated surfaces of the same is confined and transmitted through the case forming said chamber, the said case being enlarged to the extent required, so as to make this part of the stove, usually nearly cold, thereby become an effective heating-surface.

The second purpose of my invention, as named, is effected by a peculiar construction of the supplying-cylinder, as hereinafter specified.

The third-named purpose is effected by the peculiar construction and arrangement of the sections of the stove in relation to the first and second general features of my invention, as before enumerated.

In the accompanying drawings the base or bottom of the stove is represented by A, and immediately above this is chamber C, in which the fire-pot D is suspended. The lower part, B, of this chamber may serve for the ash-pit of the stove. The sides of this chamber are formed by annular or cylindrical castings *a b*, of any desirable shape, connected with the base A, and extending up to and terminating in a projecting ring or rim, *c*. This chamber is provided with doors *e e*, in which are the draft-registers *j j*. Through these doors may also be introduced an ash-pan for the reception of the ashes and cinders falling from the fire-pot.

The fire-pot D is made of cast-iron, and is in the form of an inverted bell—that is, abruptly flaring or enlarged at the top—so that it may completely cover the top of the chamber C, and its upper outer edge rest suspended upon a ledge, *a*, projecting inward from the upper edge of the casting *b*, or from the rim *c*, whereby the fire-pot is suspended. It has at the bottom my improved "mill-grate" H, or any other suitable fire-grate. There is an aperture or apertures through the flaring portion of this fire pot, by which communication may be had between the chamber C and the chamber G above. This aperture is ordinarily closed by a valve, *g*, which may be moved by any suitable means, in order to open a communication with the chamber G above and permit the dust to pass up to said chamber while agitating the fire grate H. The portion comprising the base A, separate chamber C, and fire-pot D, with their subordinate parts, and connected permanently together in the ordinary manner, may be termed the "lower section" of the stove, as shown in Figs. 2 and 3. A lower portion of the external case, composed of a set of cast-iron plates, I I, secured in a cylindrical or somewhat dome-shaped form, has at the base a rim, which fits upon the rim *c* of the lower section of the stove, and at the top it terminates in another rim, *k*. In the plates I I are illuminating-spaces, which may be glazed with mica. Concentrically within this portion of the external case is a section of the supplying-cylinder, made of cast-iron, and connected at the top by suitable supports or fastenings with the said portion of the case or its rim *k*, so as to be suspended therein, leaving a space between it and the case in order to form a continuation between the lower and upper portions of the chamber G. This section of the supplying-cylinder extends downward in the chamber G such suitable distance as may be required. It is made in the form of the frustum of an inverted cone through the greater part of its extent; but near its lower edge it is abruptly contracted in diameter, and finally tapers down to the bottom, as at *b*, (most distinctly shown in Fig. 1.) Outside of the lower end of this section K of the supplying-cylinder, and extending farther down in the chamber G, is another annular portion, L, of the supplying-cylinder, being suspended from the section K by eyes *o o* and stirrups or hasps P P, or their equivalents, as indicated in Fig. 1. This portion L is also abruptly contracted inside, so as to form a shoulder or ledge, *n*, for the purpose of supporting a lining of soap-stone or fire-brick, *m m*, as represented. The contracted lower part, *l*, of the section K laps down over the upper ends of the soapstones or fire-brick *m m*, and protects them from abrasion by contact with the descending coal. The parts described, composing this lower portion of the upper section of the stove, may be bolted together in the ordinary manner; and to complete the upper distinct section of the stove, there is first a cylindrical or equivalent extension, M, of the external case upward from the portion I of this case, being connected thereto at the rim *k*. This cylinder M may be made of cast-iron, and reaches to the top of the stove, and receives the top plate, S, thereof upon its upper end, the said top plate having the usual cover *t* for an aperture, through which the stove is replenished with coal. Another cylindrical or equivalent extension, N, also either of cast-iron or sheet-iron, is joined to the section K of the supplying-cylinder, and extends upward to a partition, *w*, which covers the supplying-cylinder at the top and separates the chamber G from the flue Q above. The plate *w* has an opening, *v*, through which coal is supplied to the supplying-cylinder. The slide or valve *y* for closing this opening *v*, and the passage *w* for the escaping products of combustion, the concentric or double flue Q, and separate central chamber P, communicating directly with the exit-flue *r* are of the same construction and arrangement and operate in the same manner as the corresponding parts described in Letters Patent of the United States granted me, and bearing date the 9th day of December, 1862, and therefore no further description is necessary here. These extensions M and N of the external case and supplying-cylinder being secured to the lower portion, I and K, of the same parts in the ordinary manner, the whole compose what may be termed the upper "complete" section of the stove. (Represented in elevation by Fig. 4.) These two main sections, Figs. 3 and 4, are connected by placing the upper upon the lower section, and uniting the two contiguous rims or flanges *c i* by short screw-bolts *x x*, Fig. 1, thus composing an individual whole ready for use. To get at the inside of either section for replacement or repairs of parts, or to prepare those of a large size for transportation, the bolts *x x* are simply unscrewed, and the separate parts are ready for that purpose.

It will be seen by the foregoing description that the first object of my invention consists in augmenting the most available heating surface of the stove, and that near the floor of the apartment to be warmed where most needed, and that to accomplish this by disposing of the heat radiated directly from the outer surface of the fire-pot, entirely independent of and separate from the heat of direct and open radiation from the fire or incandescent coal itself, and also independent of that produced by the heated products of combustion in their passage through the chamber G. An experience shows that the isolation of this heat, produced by radiation from the surfaces of the fire-pot and transmitted through the case of the chamber C, applied thus with so much practical use and value, does not lessen in any perceptible degree the amount of heat radiated from the external case of the chamber G, and hence that this is so much clear gain of effective heat produced from the whole stoves. Besides, the chamber C becomes highly heated, and the air to support the combustion of the fuel, passing up through this chamber, becomes also heated, and consequently produces a more intense and perfect combustion, also tending to keep up the temperature at and near the fire-grate, and of the coal resting immediately thereon, so that a perfect combustion takes place entirely down to the bottom of the fire-pot, also making it unnecessary to dump the grate, in order to start a new fire, but merely requiring to sift down the ashes and build the fire on top of the old coal which remains upon the grate when the fire goes out.

The advantages arising from the second feature of my invention are, first, by the complete separation and independence of the fire-pot and supplying-cylinder in the manner described, the extreme heat and consequent expansion of the interior construction (which at times must necessarily take place) cannot injure the exterior case by opening its joints, and so rendering it unfit to serve its intended purpose; second, the supplying-cylinder itself is more durable; third, incidentally, by the entire separation of the supplying-cylinder from the fire-pot, thus leaving an open space continuous all around, an enlarged radiation from the burning coal itself takes place into the chamber G, resulting in a gain to the heating-power from this direct radiation from the burning fuel, as well as from the chamber C, which receives its heat from the fire-pot D, while the heating-power of the remaining part of the stove is not diminished; fourth, there is another peculiar advantage derived from this construction which no other stove possesses—namely, while the fire-pot is so adapted to the supplying-cylinder that the stove in its action will only ignite that portion of the fuel within the fire-pot, though the supplying-cylinder may be filled with coal, it can also be used in the same manner as the common up "draft-stove," igniting only a small quantity of coal, and then the supplying-cylinder reverberates the heat, so as to cause a more perfect combustion than the same formed fire-pot without the aid of said supplying-cylinder.

Those skilled in the art will readily see the best modes of carrying my invention into practice; and I will now proceed to describe the operation of a stove thus constructed.

The fire is kindled within the fire-pot D, having the slide or valve *y* drawn forward. The kindlings may be permitted to burn in this manner until the smoke shall have passed off, when the coal may be supplied and the slide or valve *y* pushed back to close the top of the supplying-cylinder. If the fire is only required for a temporary purpose, such a quantity of coal only may be supplied as to answer for the time; but if a continuous fire is required the supplying-cylinder may be filled with coal. As combustion takes place, all the coal within the fire-pot D, if for a temporary fire, becomes ignited, and may be burned rapidly from all its surfaces the same as in a common stove; but when the supplying-cylinder is filled with coal the process is somewhat different, since in that case, although the coal is ignited up to the lower end of the supplying-cylinder, yet the combustion proceeds slowly in the upper part of the fire-pot, except that portion of the coal at the periphery below and outside of the supplying-cylinder. The gases and products of imperfect combustion which accumulate within the supplying-cylinder and the center of the fire-pot must pass therefrom at the annular aperture between the top of the fire-pot and the lower end of the supplying-cylinder, thereby aiding in keeping up a vivid combustion at that point, which, being near to and aided by the heated draft supply air, assists the combustion of the incandescent coal upon the fire-grate. The gases thus utilized and spent pass up the chamber G and through the aperture *w* to the flue Q, and thence to the exit-pipe.

What I claim as my invention, and desire to secure by Letters Patent in stoves that employ a supplying cylinder or reservoir for reserve coal, is—

1. The suspension or arrangement of the fire-pot in a chamber, C, at the base of the stove, entirely shut off or separated from the chamber which receives the heat directly from the burning fuel and the heated products of combustion, so that said chamber C may separately receive the heat radiated from the outer surfaces of the fire-pot and transmit it to the surrounding case, and from thence radiate it near the floor to the apartment to be warmed, substantially as herein specified.

2. In combination with the fire-pot, suspended or arranged in a separate chamber at the base of the stove, the suspension of the supplying-cylinder in the chamber G above and separate from the fire-pot, substantially as and for the purpose herein set forth.

3. The construction and arrangement of the stove in such a manner that it not only may be a connected whole, but may be readily separated into two sections, Figs. 3 and 4, each complete in itself, to the extent described, when thus applied to the suspended fire-pot in a separated chamber at the base of the stove, and to the separately suspended supplying-cylinder, substantially as and for the purpose herein set forth.

4. Suspending the detachable soapstone or fire-brick supporting-cylinder or section L of the separately-suspended supplying-cylinder by means of eyes *o o* and stirrups or hasps P P, or their equivalents, substantially as herein specified.

DENNIS G. LITTLEFIELD.

Witnesses:
ROBERT THOMPSON,
A. S. KIBBEE.